United States Patent [19]

Buller

[11] Patent Number: 4,798,406
[45] Date of Patent: Jan. 17, 1989

[54] MODIFIED FRICTION LOCKING RING

[75] Inventor: Michael J. Buller, Herts, England

[73] Assignee: Rolls-Royce plc, London, England

[21] Appl. No.: 86,474

[22] Filed: Aug. 18, 1987

[30] Foreign Application Priority Data

Sep. 10, 1986 [GB] United Kingdom ................ 8621739

[51] Int. Cl.⁴ .......................................... F16L 39/00
[52] U.S. Cl. .................................. 285/320; 285/321;
464/182
[58] Field of Search .................. 464/182, 84, 147, 3;
285/320, 321

[56] References Cited

U.S. PATENT DOCUMENTS

| 1,889,133 | 11/1932 | Pfefferle | 285/320 X |
| 2,580,781 | 1/1952 | Ytoffer | 464/182 X |
| 2,667,049 | 1/1954 | Guernsey et al. | 464/3 |
| 3,631,688 | 1/1972 | Quick | 464/182 |
| 3,884,087 | 5/1975 | Sukuki | 464/84 X |

FOREIGN PATENT DOCUMENTS 1393257  5/1975  United Kingdom .
1535571 12/1978  United Kingdom .

Primary Examiner—Dave W. Arola
Attorney, Agent, or Firm—Parkhurst, Oliff & Berridge

[57] ABSTRACT

A locking member for insertion into a radial gap between radially inner and outer components 28,29 respectively which rotate together. The locking member is provided for preventing relative rotational movement between the components and exploits and centrifugal forces exerted on the ring due to the rotation of the components to ensure that frictional locking is maintained. The ring is shaped to form a plurality of "levers" 25 joined together the ring. Each lever 25 comprises two limbs 22,24 and has a fulcrum (b) which engages an inward facing circumferential surface of the outer component 29. The product of the mass of one of the limbs 22 of each lever 25 with its moment about the fulcrum is greater than the corresponding product for the other limb 24 so that the centrifugal forces on the limbs 22,24 cause each lever 25 to rock about its fulcrum (b) and thereby urge the limbs 24 into engagement with an outward facing circumferential surface of the inner component 28.

8 Claims, 3 Drawing Sheets

MODIFIED FRICTION LOCKING RING

This invention relates to improvements in couplings and in particular to locking members which secure together two components which rotate at high speed by means of frictional engagement between the locking member and the components.

More particularly the invention is concerned with couplings which employ locking members of the type described in British Pat. No. 1,393,257.

Referring to the above mentioned patent, there is disclosed a coupling which employs a friction locking ring which is interposed in a radial gap that is provided between a first component and a second component. In one application one of the components may be a shaft (such as for example a shaft of a turbomachine that connects a compressor rotor to a turbine rotor) and the other component a nut which is screwed onto the shaft to clamp various assemblies together. The friction locking ring consists of a ring (which may be complete or may have a radial split) and is shaped as an "imperfect circle". That is to say, the locking ring makes contact at spaced regions around its outer circumference with a radially outer located component and makes contact at spaced regions around its inner circumference with a radially inner located component. The frictional engagement of the locking ring with the two components ensures that the components are locked together and cannot become uncoupled inadvertently.

Couplings of the type described in the above patent are in widespread use in various gas turbine aeroengines manufactured by Rolls-Royce Limited, and perform satisfactorily in all the applications identified so far.

The natural development of gas turbine engines predicts the move towards engines having higher shaft speeds than present engines. It can be shown that friction locking rings constructed in accordance with the above mentioned patent, which perform well in low speed or static conditions, release their frictional locking at high speeds.

An object of the present invention is to exploit the high centrifugal forces which the friction locking rings experience at high rotational speeds to enhance, or at least not diminish, the frictional locking forces exerted by the locking ring on components to be locked together.

The invention as claimed comprises a locking member which is shaped, constructed and arranged to define a plurality of levers and exploits the centrifugal forces which are exerted on the locking member thereby to maintain frictional locking.

The present invention will now be described by way of examples with reference to the accompanying drawings, in which.

Figure 7:
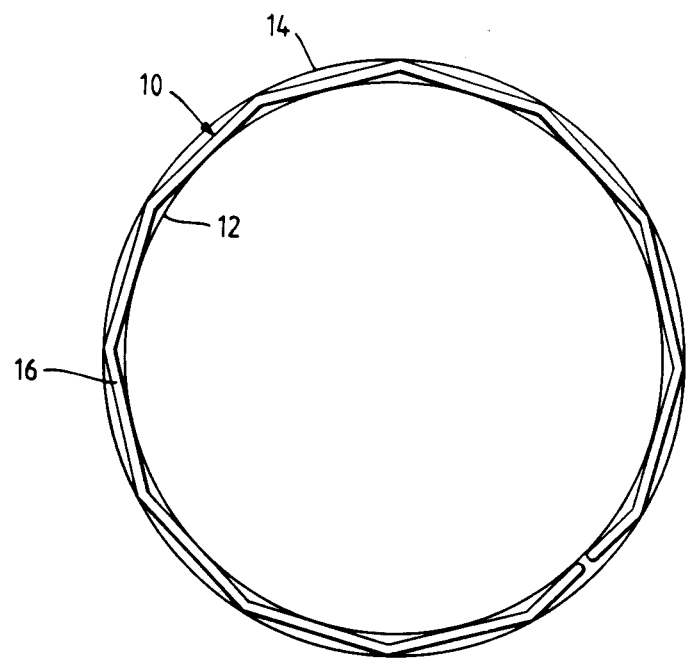
FIG. 7 illustrates a prior art form for a locking ring.
Figure 8:
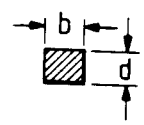
FIG. 8 illustrates the cross-sectional shape of a portion X of the prior art ring of FIG. 7.

Referring to FIGS. 7 and 8, the prior known friction locking ring 10 is constructed as a split ring which is in the form of a polygon. In operation, the ring is located between the outer surface of a shaft 12 and the inner circumferential surface of a nut 14 which is threaded onto the shaft. The ring comprises a plurality of substantially even length limbs 16. The intersections between adjacent limbs define points of contact with the inner surface of the nut 14 and the limbs 16 contact the shaft at a region approximately midway between the intersections of the limbs.

The locking ring 10 functions satisfactorily for static situations or situations where the shaft rotates about its central axis at slow speeds.

Rings of the type shown in FIGS. 7 and 8 are in widespread use on shafts of gas turbine engines for preventing the nuts, which clamp together the rotor assemblies, from loosening.

It can be shown that with higher shaft speeds, using typical ring dimensions, the centrifugal force exerted on the limbs will cause the ring to release its grip on the shaft and consequently allow the nuts to undo with potentially devastating results.

Consider a locking ring of the type shown in FIGS. 7 and 8, and assume that it has twelve limbs and that an interference fit of 0.003 inches (0.08 mm) exists between the ring and the shaft. In other words, the mid-region of the limbs are deflected by 0.003 inches (0.08 mm). Under static conditions each limb can be regarded as an encastre beam with a centre load W at each contact point between the ring and the shaft, and the deflection, $$\delta = \frac{W \cdot L^3}{192\, EI}$$

where L is the length of the beam, E is Young's Modulus of Elasticity for the material of the ring, and I is the second moment of area of the ring.

$(I = bd^3/12)$ for a rectangular cross-section, where b is the axial length of the cross-section (typically 0.120 ins (3.0 mm)) and d is the radial length of the cross section (typically 0.080 ins (2.0 mm)). See FIG. 8).

$$\therefore I = \frac{0.120 \times 0.080^3}{12} = 5.12 \times 10^{-6}\, in^4$$

If E is typically $30 \times 10^6$, and L = 1.0 inches (25.4 mm) then $$W = \frac{\delta 192\, EI}{L^3}$$
$$= 0.003 \times 192 \times \frac{(30 \times 10^6)}{1.0^3} \times 5.12 \times 10^{-6}$$
$$\therefore W = 88.47\, lbf$$

For a ring having say 12 beams the locking load applied radially would be $12 \times 88.47 = 1061.6$ lbf.

From the well known equation $(f/y) = (M/I)$ where f=stress, y=distance from the neutral axis of the cross section, M=bending moment, and I=second moment of area of the cross section, one can calculate the bending stress f.

$$f = \frac{M}{I} y$$

$$M = \frac{WL}{8}$$

$$\therefore f = \frac{(88.47 \times 1.0)}{8 \times 2} \times \frac{0.08}{(5.12 \times 10^{-6})}$$

$$\therefore f = 86\,396 \text{ lbf/in}^2$$

$$\therefore f = 38.57 \text{ Tonf/in}^2$$

Consider now the dynamic conditions where the ring experiences a cetrifugal load when the shaft rotates.

For an encastre beam with a centrifugally induced uniformly distributed load (UDL) the centre deflection $$\delta = \frac{WL^4}{384\,EI}$$

where W is now the centrifugal force per unit length of each beam.

$$\therefore W = \frac{0.003 \times 384 \times (30 \times 10^6) \times (5.12 \times 10^{-6})}{1.0^4}$$

$$\therefore W = 176.95 \text{ lbf/inch}$$

When the centrifugally induced deflection equals the interference fit, all locking torque will be lost. The speed at which this would occur can be calculated from the formula Centrifugal force = $(mr/g)\omega^2$ where m is the mass of each limb, r is the radial distance of each limb measured normal to the mid span of the limb, and $\omega$ is the angular velocity.

$$\text{So } 176.95 = \frac{0.00288}{32.2} \times \frac{1.83}{12} \omega^2$$

$$\therefore \omega = 3601.8 \text{ rads/sec}$$

$$= 34{,}395 \text{ revolutions per minute}$$

It can be seen that if the shaft were to rotate at this speed all locking torque would be lost.

Furthermore the maximum stress occurs at each end of each beam.

If $f=(My/I)$ and $M=(-WL^2/12)$ then using the above parameters:

$f = 51.43$ Tonf/in$^2$

If the bending moment at the centre of each limb $$M = \frac{WL^2}{24}, \text{ then the stress at the centre of each limb}$$

$$= 25.71 \text{ Tonf/in}^2.$$

It will be appreciated that any attempt to prevent the total loss of friction locking torque by means of stiffening the ring or increasing the interference fit would further increase the surface stress applied by the ring to the shaft. Such an increase of this already high stress would damage the shaft.

Figure 1:
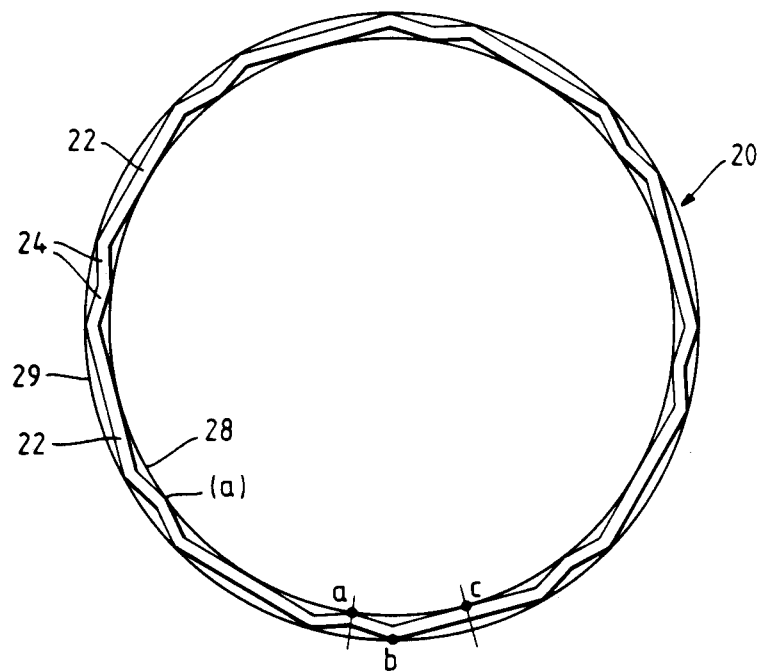
FIG. 1 illustrates one form of locking member constructed in accordance with the present invention.

Referring now to FIG. 1 there is shown a locking ring 20 constructed in accordance with the present invention. The ring is constructed of the same material as the ring of FIGS. 7 and 8 and has the same cross sectional shape, the same interference fit, and overall dimensions as the ring of FIGS. 7 and 8.

Figure 3:
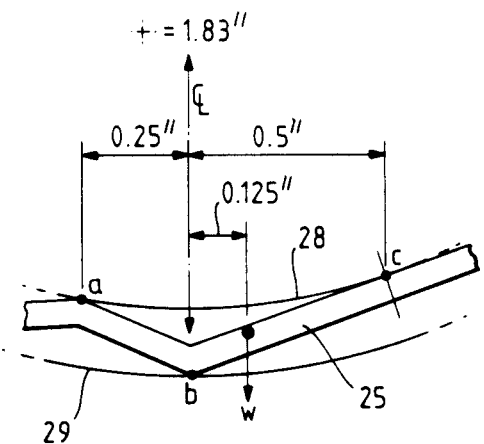
FIG. 3 illustrates schematically one of the "levers" of the ring of FIG. 1, and shows one set of dimensions typical of a locking ring constructed in accordance with the present invention.
Figure 4:
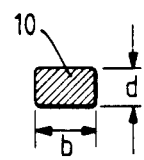
FIG. 4 illustrates the cross sectional shape of the ring of FIGS. 1 and 3.

The ring of FIG. 1 differs from that of FIGS. 7 and 8 in that it has eight first limbs 22 separated by shorter cranked second limbs 24. Each limb 22 together with an adjacent cranked section 24 constitutes an assymmetric lever 25 (FIG. 3).

From the above calculations, the static load between each limb 22 and the shaft 28 will be approximately 88.47 lbf (the value is approximate since the ends of the limb 22 will no longer be encastre as symmetry will have been lost, the limbs 24 will be stiffer and hence some rotation about point b will occur). Therefore the total load is approximately 707.76 lbf. In addition to this static load there is a static load at each of the eight points marked (a) on the drawing. The ring can be designed if desired so that the combined static loads equal that for the ring of FIGS. 7 and 8.

Consider the ring of FIG. 1 rotating with a shaft speed of 34,395 RPM. Assuming that the ring has a geometry as shown in FIG. 3, and a density of 0.3 lb/in$^3$ then for element a-b-c $$W \text{ (the centrifugal force)} = \frac{mr}{g} \omega^2 = 132.71 \text{ lbf.}$$

Therefore relative to the static condition the load applied by the ring to the shaft 28 at point (a) will increase by $132.71 \times (0.125/0.250) = 66$ lbf at this speed of rotation.

Thus the loss of locking load at point C (where the load decreases from 88.47 lbf static to zero when rotating at 34395 RPM) is offset by an increase in the load at (a) by 66.36 lbf from whatever is present under static conditions.

At higher speeds no further loss can occur at (c) because a clearance would exist, but the contact load at (a) would increase until yielding of the ring occurs. The ratio of the length of limb a-b compared with the limb b-c could be adjusted to give increased locking torque throughout desired speed ranges.

Figure 5:
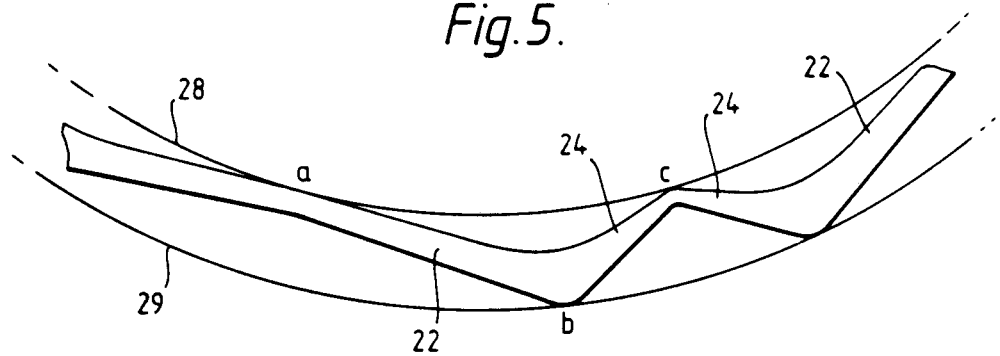
FIG. 5 illustrates a second form of locking ring constructed in accordance with the present invention.

Should yielding at the fulcrum of each lever (point b) be considered a problem then a locking ring 20 having high speed capability with low shaft contact stresses would be constructed in accordance with FIG. 5.

Referring to FIG. 5 each first limb 22 of the ring is made slender to give low assembly contact stresses at (a) and (c), whilst the second limbs are configured to give low bending stiffness at (c). The cross sectional area of the ring varies around the perimeter of the ring. As will be seen, the ring is of larger cross sectional area at the fulcrums (points b) than at the points (a) and (c) where the first and second limbs 22, 24 contact the shaft 28.

Figure 2:
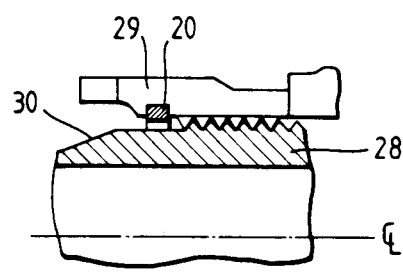
FIG. 2 illustrates the locking ring of FIG. 1 in position to lock together two components.

In operation the rings of FIGS. 1 and 5 are located in a radial gap between the shaft 28 and the nut 29 (see FIG. 2). To assist loading of the ring, and to ensure that there is an interference fit, the ring is of slightly smaller diameter than the shaft 28 and the shaft 28 is provided with a conical region 30 which assists in expanding the ring. For each lever 25, the product of the mass of the limb 22 with its moment about the fulcrum is greater than the corresponding product for the limb 24. Accordingly, centrifugal forces on the limbs 22 due to rotating of the shaft 28 cause the levers 25 to rock about the fulcrums (points b) and urge the limbs 24 into contact with the shaft 28. The fulcrums contact the nuts 29 to prevent rotation.

The limbs are shown in the drawings as being substantially straight. They need not be and could, in fact, be arcuate providing they contact the shaft 28 at regions intermediate the fulcrums.

Figure 6:
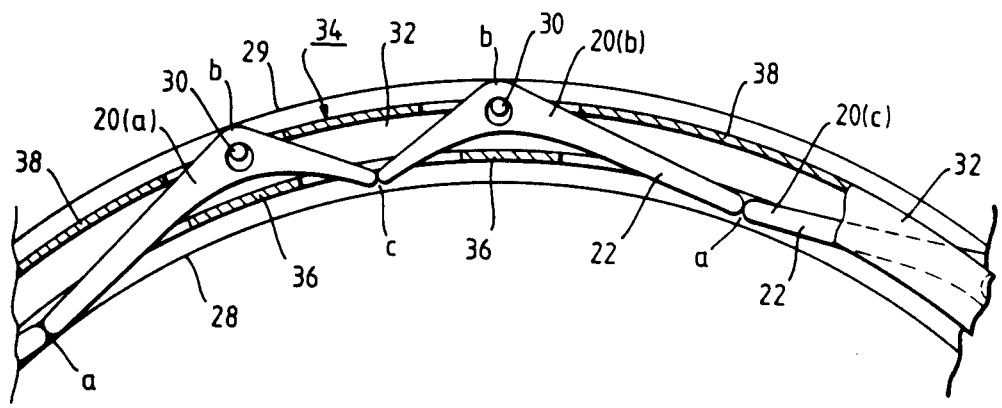
FIG. 6 illustrates another locking ring form constructed in accordance with the present invention.

In the above described embodiments the locking ring 20 comprises a plurality of pairs of limbs 22, 24 defining a unitary member. Whilst it is unlikely that there will be any problem of fatigue due to bending of the ring in the vicinity of the points (a) it is contemplated that in an alternative construction one could cut the ring 20 at points (a) and (o) to form discrete segments of the ring as shown in FIG. 6. The segments 20(a), 20(b) are assembled to form a ring of a similar shape to that shown in FIG. 1 or FIG. 5. The segments are located relative to each other so that the short limbs 24 abutt each adjacent short limb 24 by assembling them in a common carrier cage 34 which allows the segments to move by rocking about their fulcrum.

The segments are losely located on spindles 30 carried by axially facing walls 32 of an annular cage 34. The inner and outer circumferential walls 36, 38 of the cage have openings which allow the segments 20a, 20b, 20c to project through and thereby contact the shaft 28 and nut 29. The spindles locate in oversize holes in the segments 20(a), 20(b), 20(c) so that each segment can rock about the fulcrum (b).

I claim:

1. A locking member for insertion into a radial gap between radially inner and outer components which are fixed relative to each other and which rotate together for the purpose of restricting relative rotational movement between the components, said member comprising a plurality of levers located around an axis of rotation of the components, each lever having a first and a second limb, one of which is at an angle relative to the other and thereby defines a fulcrum at the intersection of the two limbs, said fulcrum of each lever being positioned so that, in use, it contacts an inner facing circumferential surface of the outer component, and said limbs being shaped so that, in use they contact an outward facing circumferential surface of the inner component at circumferentially spaced regions between the fulcrums, the product of the mass of the first limb of each lever with its moments about the respective fulcrum being greater than the corresponding product for the second limb of each lever so that, in use, centrifugal forces acting on each first limb cause the levers to rock about their respective fulcrums and thereby urge the second limbs radially inwards into engagement with the inner component.

2. A locking member according claim 1 wherein each limb is substantially straight between its respective fulcrum and the region where it contacts the inner component.

3. A locking member according to claim 1 where the first limbs are longer than the second limbs.

4. A locking member for insertion into a radial gap between radially inner and outer components which are fixed relative to each other and which rotate together for the purpose of restricting relative rotational movement between the components, said member comprising a ring shaped to define a plurality of levers joined together around a circumference of the ring, each lever having a first and a second limb, one of which is at an angle relative to the other and thereby defines a fulcrum at the intersection of the two limbs, said fulcrum of each lever being positioned so that, in use, it contacts an inner facing circumferential surface of the outer component, and said limbs being shaped so that, in use they contact an outward facing circumferential surface of the inner component at regions spaced around the ring intermediate the fulcrums, the product of the mass of the first limb of each lever with its momemt about the respective fulcrum being greater than the corresponding product for the second limb of each lever so that, in use, centrifugal forces acting on each first limb cause the levers to rock about their respective fulcrums and thereby urge the second limbs radially inwards into engagement with the inner component.

5. A locking member according to claim 4 wherein the cross sectional area of the ring is substantially uniform around its circumference.

6. A locking member according to claim 4 wherein the cross sectional area of the ring varies around its circumference; the cross-sectional area being at its greatest at each fulcrum and at its least at the regions where the first and second limbs contact the inner component.

7. A locking member according to claim 4 wherein the ring is split at a region around its perimeter.

8. A locking member according to claim 4 wherein the second limbs of each lever are connected together at the region where, in use, they contact the inner component.

* * * * *